United States Patent
Yoon et al.

(10) Patent No.: US 7,599,704 B2
(45) Date of Patent: Oct. 6, 2009

(54) VOICE CALL CONNECTION METHOD DURING A PUSH TO TALK CALL IN A MOBILE COMMUNICATION SYSTEM

(75) Inventors: Sung-Jae Yoon, Gumi-si (KR); Dong-Han Kang, Daegu (KR); Jae-Gwan Shin, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 11/193,375

(22) Filed: Aug. 1, 2005

(65) Prior Publication Data
US 2006/0035658 A1    Feb. 16, 2006

(30) Foreign Application Priority Data
Aug. 10, 2004  (KR) .................. 10-2004-0062926

(51) Int. Cl.
- H04B 7/00 (2006.01)
- H04Q 1/56 (2006.01)
- H04L 5/14 (2006.01)
- H04B 7/005 (2006.01)
- H04B 7/216 (2006.01)

(52) U.S. Cl. .................. 455/518; 455/517; 455/519; 455/521; 370/276; 370/278; 370/335

(58) Field of Classification Search ............ 455/90.2, 455/79, 67.14, 426.1, 452.1, 452.2, 455, 455/456.1, 458, 509, 517, 515, 512, 518, 455/520, 521, 522, 573, 572, 567, 561, 519; 370/275, 260, 261, 312, 328, 338, 340, 390, 370/276, 277, 278, 296, 285
See application file for complete search history.

(56) References Cited

U.S. PATENT DOCUMENTS

| | | | | |
|---|---|---|---|---|
| 6,990,353 B2 * | 1/2006 | Florkey et al. | .............. | 455/519 |
| 6,999,755 B2 * | 2/2006 | Park | .................. | 455/414.1 |
| 7,230,930 B2 * | 6/2007 | Ahya et al. | .............. | 370/278 |
| 7,313,103 B2 * | 12/2007 | Cox et al. | .............. | 370/285 |
| 7,319,879 B2 * | 1/2008 | Harris et al. | ............. | 455/458 |
| 2002/0086665 A1 * | 7/2002 | Maggenti et al. | ......... | 455/416 |

(Continued)

FOREIGN PATENT DOCUMENTS

WO    WO 01/37526    5/2001

Primary Examiner—Nay A Maung
Assistant Examiner—Paul P Tran
(74) Attorney, Agent, or Firm—Roylance, Abrams, Berdo & Goodman, L.L.P.

(57) ABSTRACT

Disclosed is a method for connecting a phone call during a Push To Talk (PTT) call traffic in a mobile communication system. The method comprises the steps of searching for a subscriber information of a selected current subscriber from both a PTT subscriber information and a subscriber group list, if a predetermined phone call key has been input; determining if the subscriber information of the selected current subscriber which has been searched from the PTT subscriber information and the subscriber group list is matched to a subscriber information stored in an address registry to confirm the matched subscriber information of the address registry; and terminating the PTT session of the PTT call traffic, connecting the phone call to the selected current subscriber's phone number based on the matched subscriber information of the address registry to perform the phone call traffic.

10 Claims, 5 Drawing Sheets

U.S. PATENT DOCUMENTS

2003/0119540 A1* 6/2003 Mathis ........................ 455/518
2003/0206619 A1* 11/2003 Curbow et al. ......... 379/210.01
2004/0228292 A1* 11/2004 Edwards ..................... 370/277
2005/0124365 A1* 6/2005 Balasuriya et al. .......... 455/518

* cited by examiner

VOICE CALL CONNECTION METHOD DURING A PUSH TO TALK CALL IN A MOBILE COMMUNICATION SYSTEM

PRIORITY

This application claims the benefit under 35 U.S.C. 119(a) of an application entitled "VOICE CALL CONNECTION METHOD DURING PUSH TO TALK CALL IN MOBILE COMMUNICATION SYSTEM" filed in the Korean Industrial Property Office on Aug. 10, 2004 and assigned Serial No. 2004-62926, the entire contents of which are hereby incorporated by reference.

BACKGROUND OF THE INVENTION

1. Field of the Invention

The present invention relates to a mobile communication system using a Push To Talk (PTT) scheme. More particularly, the present invention relates to a method for establishing a phone call during the PTT call traffic.

2. Description of the Related Art

The Push To Talk (PTT) is referred to as "a basic call traffic scheme" used for a walkie-talkie or Handheld Transceiver (HT). The PTT scheme allows a user to communicate with her/his counterpart by properly operating PTT buttons disposed on, for example, a walkie-talkie. Specifically, in an operation for communication based on the PTT scheme, the user simply presses the PTT button when talking to her/his counterpart, and releases the pressed PTT button when listening to her/his counterpart's talking. Such a PTT scheme provides one-to-one or one-to-multi party communication through which the users can simply and rapidly communicate with each other.

In recent years, conventional mobile communication systems have provided so called internet phone service such as a Voice over IP (VoIP) scheme in which a specific Internet Protocol (IP) has been pre-assigned to each of the terminals of the system. Similar to the walkie-talkie or HT, such a VoIP scheme can also allow the mobile communication terminals to communicate with each other in the form of mobile communication PTT service which is capable of providing one-to-one or one-to-multi communication.

Such a mobile communication PTT service can provide voice/data services through which multiple users or groups can communicate simultaneously with each other. In order to start the mobile communication PTT service, the user presses a PTT button disposed properly in the mobile communication terminal capable of providing the PTT service so that the PTT mobile communication terminal may send a PTT service request to a mobile communication network related therewith. Then, the mobile communication network denies or accepts the requested service to, in case of the acceptance, assign the requested resources based on the determination criterions such as availability of resources, priority of the requesting user, etc. If the requested service has been accepted, the mobile communication network sets up connections from among all the active users belonging to a certain user group. Consequently, the called mobile communication terminal outputs an alarm sound and message displays for indicating the received PTT call request to the corresponding called user who, then, recognizes the PTT call request to start speaking or communication with the calling user. After setting up a voice traffic connection, the user who has requested a voice service can send the voice information to the corresponding user who then can listen to the voice just sent.

As mentioned above, during such a mobile communication PTT service, anyone from among the mobile terminal users which have participated in the PTT communication may want to communicate with her or his counterpart through the general voice call (hereinafter referred to as "phone call"), not the PTT communication. In this case, however, the user who wants the general phone call must operate her or his mobile communication terminal to terminate the current PTT session and then search for the counterpart's phone number in an address record or its equivalent or write directly the desired phone number for starting the phone call. Specifically, the user who wants to change the current PTT call traffic into the general phone call has to input several keys by selecting several menus for performing the general phone call instead of the PTT call traffic. Therefore, in the prior art, it is time-consuming and tedious to perform the key inputs and the menu selections for connecting the general phone call.

SUMMARY OF THE INVENTION

Accordingly, the present invention has been made to solve the above-mentioned problems occurring in the prior art, and an object of the present invention is to provide a method for establishing a phone call based on the PTT wherein key input operations can be simplified to significantly reduce the time and effort to operate the key inputs and menu selections and solve the problem of the prior art mentioned above.

In order to accomplish this object, according to a first aspect of the present invention, there is provided a method for connecting a phone call during a Push To Talk (PTT) call traffic in a mobile communication system. The method comprising the steps of searching for a subscriber information of a selected current subscriber from both a PTT subscriber information and a subscriber group list, if a predetermined phone call key has been input; determining if the subscriber information of the selected current subscriber which has been searched from the PTT subscriber information and the subscriber group list is matched to a subscriber information stored in an address registry to confirm the matched subscriber information of the address registry; and terminating the PTT session of the PTT call traffic, connecting the phone call to the selected current subscriber's phone number based on the matched subscriber information of the address registry to perform the phone call traffic.

Preferably, the method further comprises the steps of sending, to a PTT server, a request message of a predetermined format for requesting the PTT subscriber information and the subscriber group list, if the subscriber information of the selected current subscriber searched from the PTT subscriber information and the subscriber group list is not matched to the subscriber information stored in the address registry; receiving the requested PTT subscriber information and the subscriber group list from the PTT server to update the address registry based on the received PTT subscriber information and the received subscriber group list; and terminating the PTT session of the PTT call traffic, connecting the phone call to the selected subscriber's phone number based on the updated subscriber information to perform the phone call traffic.

BRIEF DESCRIPTION OF THE DRAWINGS

The above and other objects, features and advantages of the present invention will be more apparent from the following detailed description taken in conjunction with the accompanying drawings, in which.

Throughout the drawings, the same or similar elements, features and structures are represented by the same reference numerals.

DETAILED DESCRIPTION OF EXEMPLARY EMBODIMENTS

Hereinafter, embodiments of the present invention will be described with reference to the accompanying drawings. The exemplary embodiments such as specific elements found in the following description are intended only to help understand the present invention. Therefore, it will be understood by those skilled in the art that various changes in form and details may be made therein without departing from the spirit and scope of the invention.

Figure 1:
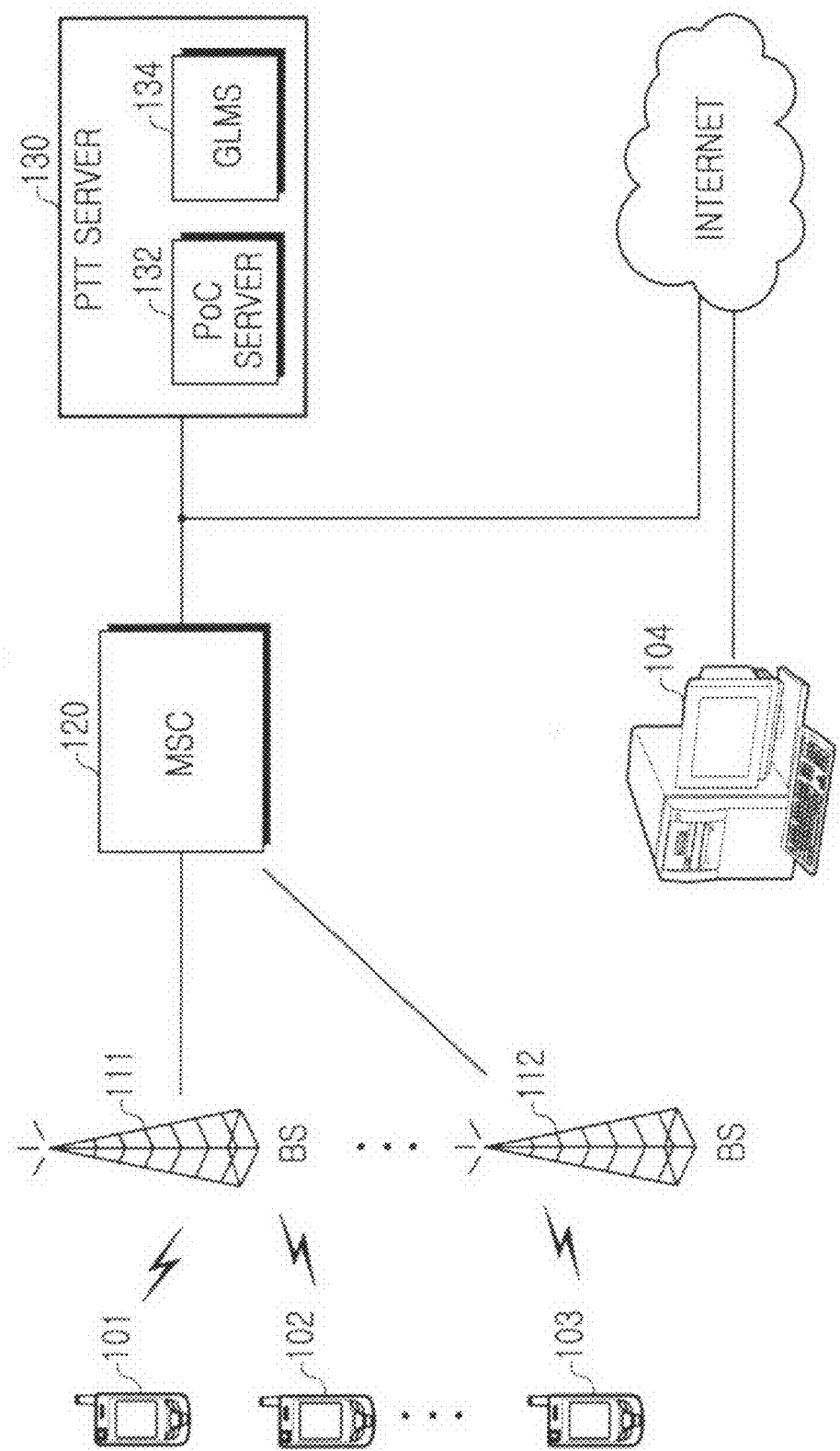
FIG. 1 illustrates a schematic block structure of a mobile communication system using a Push To Talk (PTT) scheme according to an embodiment of the present invention.

FIG. 1 illustrates a schematic block structure of a mobile communication system using a Push To Talk (PTT) scheme according to an embodiment of the present invention. Referring to FIG. 1, the mobile communication system using the PTT scheme comprises a plurality of base station transceiver systems (BTSs) 111 and 112 which communicate with a plurality of mobile communication terminals 101, 102 and 103 located in the service coverage area of the BTSs to provide the mobile communication services. The plurality of base station transceiver systems (BTSs) 111 and 112 are connected to a mobile switching center (MSC) 120 which is connected to a PTT server 130 via a data network.

The PTT server 130 performs realtime management operation for PTT user groups comprising general controlling for PTT user groups, mediating and holding of PTT communication requests, distributing of subscriber registration lists and call setups/separations of needed systems and network resources. Such a PTT server 130 comprises a PTT over Cellular (PoC) server 132 for performing a communication function for the PTT service in the mobile communication network, and a Group and List Management Server (GLMS) 134 for managing PTT subscriber information and subscriber group list also known as a "buddy list".

Each of the mobile communication terminals 101, 102 and 103 comprises a PTT module for performing PTT-related operations such as a PTT call request transferred to the PTT server 130 to wirelessly send the PTT call request in the form of a previously and properly set format to the BTSs 111 and 112 when operating the PTT call traffic. The MSC 120 receives the PTT call request from the BTSs 111 and 112 and provides the received PTT call request to the PTT server 130. The MSC 120 has an Inter Working Function (IWF) for processing certain data packets such as a PTT call request with the PTT server 130.

The users can connect their mobile communication terminals 101, 102 and 103 to the PTT server 130 to perform modification operations such as establishing, changing or deleting the group list information and the individual information which have been previously set up by the users. Alternatively, the user can connect their personal computer 104 to the PTT server 130 via the Internet to also modify the group list information and the individual information which have been previously set by the user.

Figure 2A:
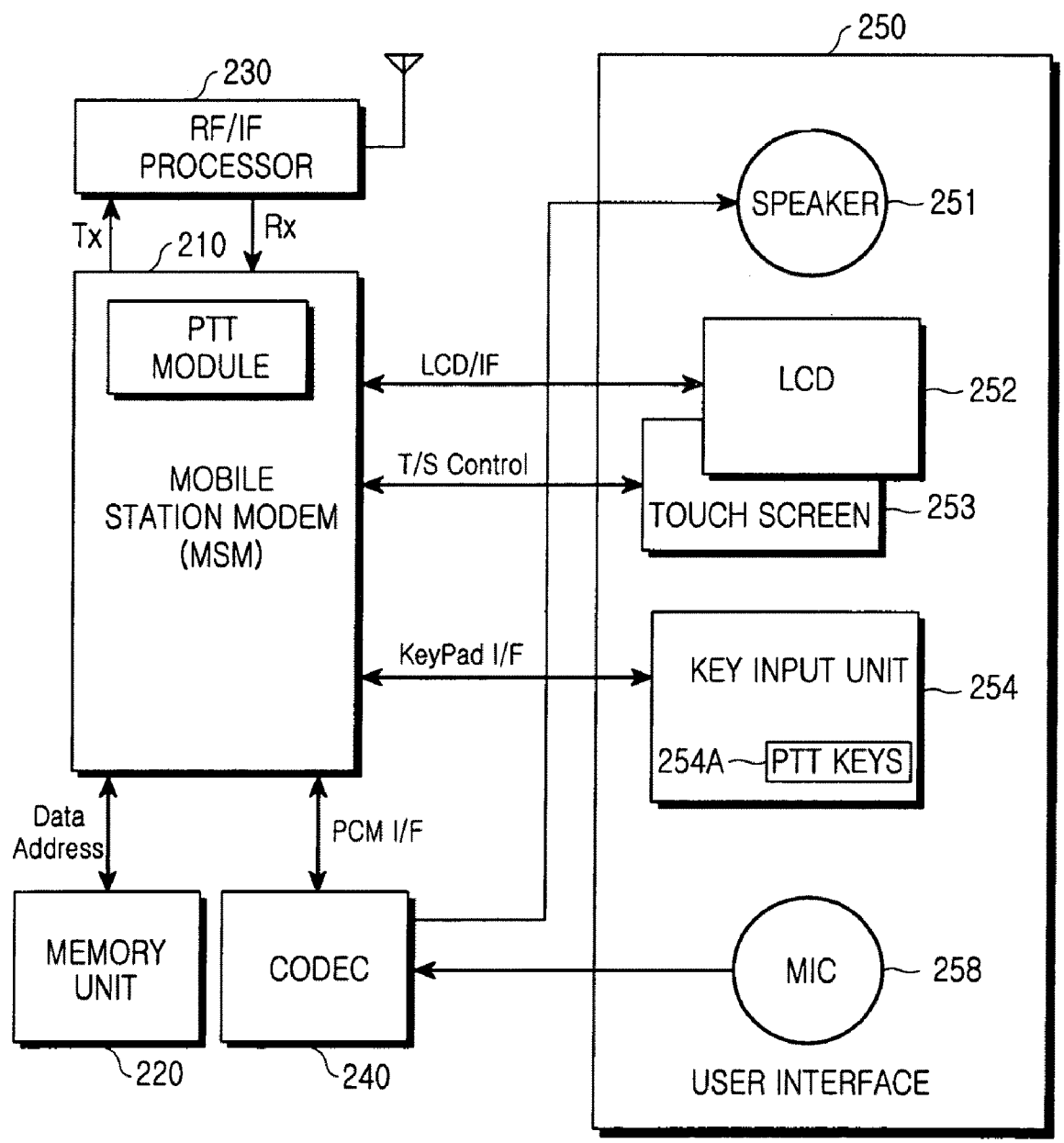
FIG. 2A illustrates a schematic block structure of a PTT mobile communication terminal according to an embodiment of the present invention.
Figure 2B:
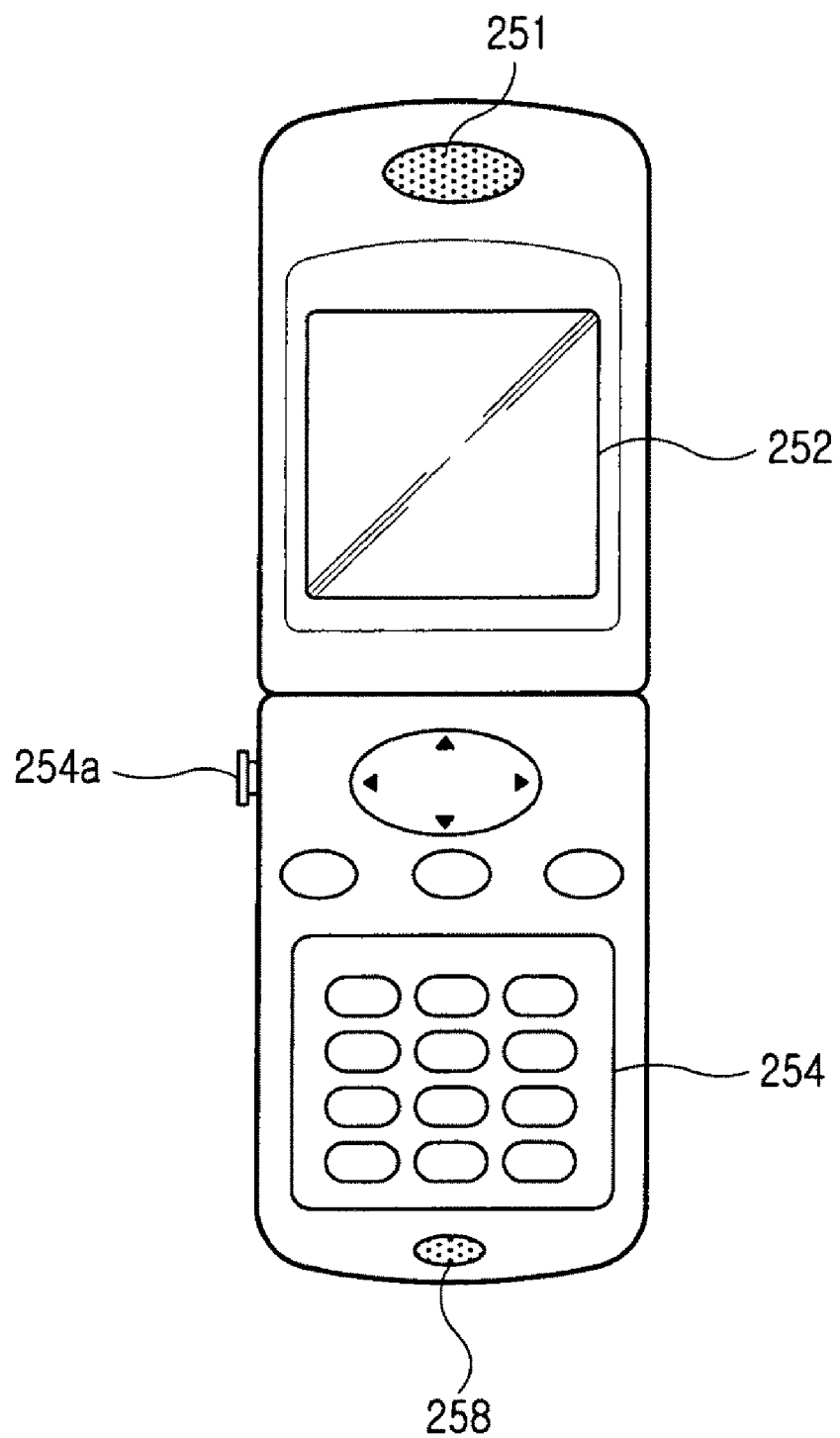
FIG. 2B illustrates an exterior structure of a PTT mobile communication terminal according to an embodiment of the present invention.

FIG. 2A illustrates a schematic block structure of a PTT mobile communication terminal according to an embodiment of the present invention, and FIG. 2B illustrates an exterior structure of a PTT mobile communication terminal according to an embodiment of the present invention. Referring to FIGS. 2A and 2B, the mobile communication terminal using the principle of the present invention is capable of performing interface operations with the user. The mobile communication terminal comprises a user interface 250, a radio frequency/intermediate frequency (RF/IF) processor 230 for processing radio signals, a memory unit 220 having read only memory (ROM) and random access memory (RAM) for storing various operation programs and operation-related data, a voice signal processor (CODEC) 240 for processing voice signals and a mobile station modem (MSM) 210 for serving as a modem as well as a central processing unit for controlling a mobile communication terminal. The user interface 250 comprises a speaker 251, a display unit such as a Liquid Crystal Display (LCD) 252, a key input unit 254 and a mic 258.

Hereinafter, the operation of each function unit of the mobile communication terminal applied to an embodiment of the present invention will be described. First, in the user interface 250, the mic 258 converts the user's voice into an electrical signal to send the electrical signal to the voice signal processor (CODEC) 240. The speaker 251 receives the electrical signal from the voice signal processor 240 and generates an audible sound based on the received electrical signals. The key input unit 254 of the user interface 250 comprises a plurality of numeric/character keys for inputting numbers and characters, a plurality of function keys for performing the mobile communication functions, and dedicated PTT keys 254a for performing the PTT functions. Such a key input unit 254 transfers key input data to the mobile station modem 210 when the user inputs the related certain data or information through the keys of the unit. Although the dedicated PTT keys 254 are disposed in the separate form from the other keys on the key input unit as shown in FIG. 2A, the PTT keys may be implemented by using a part of the known or conventional keys. The display unit 252 which can be a LCD comprises a LCD controller, a memory for storing image data and LCD display elements. The display unit 252 displays characters or number information such as a current condition of the mobile communication terminal or background images related therewith. The display unit 252 may comprise a touch screen 253 for the LCD.

The RF/IF processor 230 comprises a RF transmitter for up-converting frequencies of the signals to be transmitted and amplifying the signals, and a RF receiver for low-noise amplifying received signals and down-converting the frequencies of the received signals. The RF/IF processor 230 receives modulated signals from the mobile station modem 210, converts the modulated signals into intermediate frequencies (IF). Also, the RF/IF processor 230 converts the intermediate frequencies into radio frequencies (RF) to be output to the BTSs via an antenna. Furthermore, the RF/IF receives the radio signals from the BTSs via an antenna so that the received radio signals are converted sequentially into the intermediate frequencies and the baseband to be provided to the mobile station modem 210.

The voice signal processor 240 which is typically formed of audio CODEC receives analog voice signals from the mic 258 to convert the received analog voice signals into digital signals such as pulse code modulation (PCM) which are transmitted to the mobile station modem 210. Also, the voice signal processor 240 receives digital signals (PCM) of a calling party's voice from the mobile station modem 210 to convert the received digital signals to the analog signals to be output to the speaker 251. Although the voice signal processor 240 is designed as a stand alone unit as shown in FIG. 2A, the processor 240 may be embedded integrally in the mobile station modem so that the processor and the modem may be combined together in the form of one chip.

The mobile station modem 210 can perform various functions of the mobile communication terminal in accordance with the key data input through the key input unit 254, while various information such as current states and user menu may be displayed on the display unit based on performing the functions. Especially, in the case of processing the voice signals for phone traffic, the mobile station modem 210 receives the PCM voice signals from the voice signal processor 240, and converts and modulates the received PCM voice signals by channel coding and interleaving to provide the converted and modulated signals to the RF/IF processor 230. Further, the mobile station modem 210 receives the voice signals provided from the RF/IF processor 230 and processes the received voice signals through demodulating, equalizing, channel decoding and de-interleaving to generate the resultant PCM voice signals which are then sent to the voice signal processor 240. Furthermore, the mobile station modem 210 has a PTT module for performing the PTT call traffic operation, especially a phone call or voice call connection operation during the PTT call traffic based on the characteristics of the present invention.

In operation of the mobile communication terminal shown in FIG. 2A and 2B, if the user performs a dialing operation and setting operation for a calling mode through the key input unit 254, then the mobile station modem 210 monitors those operations and processes the input dialing information to then convert the input dialing information into corresponding radio signals through the RF/IF processor 230 to be output. Next, response signals are received from the calling party's terminal via the RF/IF processor 230 in the mobile station modem 210 so that the received response signals may be output to the speaker 251 via the voice signal processor 240 to consequently form a voice traffic path for communication. In the case of a calling mode, the mobile station modem 210 monitors just the calling mode through the RF/IF processor 230, and directs the voice signal processor 240 to generate corresponding ring signals. Next, similar to the calling mode, when the called party sends response signals, the mobile station modem 210 monitors that response signals which may be output to the speaker 251 via the voice signal processor 240 to consequently form a voice traffic path for communication. As mentioned above, only the exemplary voice communication was described for both the calling and the called modes according to one embodiment of the present invention. However, alternatively, data communication functions for packet data and image data and the PTT communication operation based on PTT key inputs also can be applied to the present invention.

Figure 3:
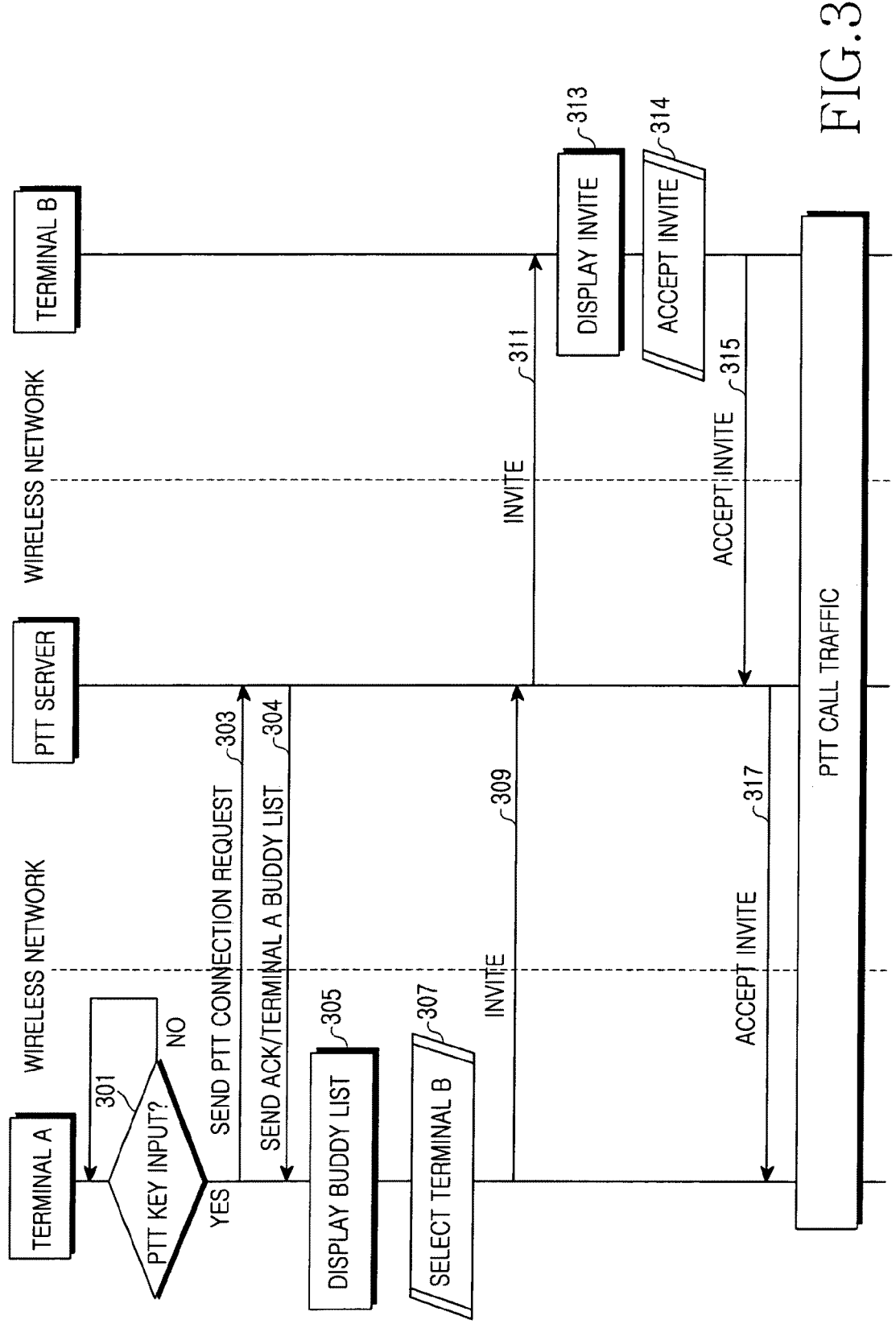
FIG. 3 illustrates a flow chart for explaining an operation process of a general PTT call traffic connection in the mobile communication system of FIG. 1 according to an embodiment of the present invention.

FIG. 3 illustrates a flow chart for explaining an operational process of a general PTT call traffic connection in the mobile communication system of FIG. 1. Referring to FIG. 3, firstly, if the user who wants the PTT communication inputs the PTT keys disposed on a mobile communication terminal (terminal A in FIG. 3) or operates PTT call functions by a menu setting operation, then in step 301, the mobile station modem confirms the PTT key input or the operation of the PTT call functions to drive the PTT application. Next, in step 303, the mobile station modem sends the PTT connection request message to the PTT server via the wireless network. If the PTT server confirms the corresponding user who has previously sent the PTT connection request message through the GLMS server, then in step 304, the PTT server acknowledges the PTT connection request of the corresponding user and sends a buddy list which is a subscriber information of the terminal A PTT call traffic group, to the corresponding user (i.e., sending ACK/terminal A buddy list). Accordingly, the mobile station modem of the terminal A receives such a buddy list so that the display unit may properly display the buddy list in step 305. Referring to the displayed buddy list, the user of the terminal A can operate proper direction keys to select her/his counterpart who the user wants to communicate with through the PTT scheme. Specifically, in step 307, the mobile communication terminal (terminal A) inputs the selected counterpart or the selected subscriber (in case of FIG. 3, terminal B) by the user's operation. Next, in step 309, the mobile communication terminal (i.e., terminal A) sends a PTT call request message (referred to as an "INVITE") for the selected subscriber (i.e., the terminal B) to the PTT server via the wireless network. Such a PTT call request message (INVITE) comprises, for example, an ID information of the calling or called side.

Hereinafter, a description will be made in more detail about the step that the mobile communication terminal (TERMINAL A) sends the PTT call request (INVITE) to the PTT server. Above all, the mobile communication terminal (terminal A) sends the PTT call request message (INVITE) in the form of Short Data Burst (SDB) to the base station to which the terminal A is connected. Then, the mobile communication terminal (terminal A) negotiates (nego) with the base station for service options (SO_PTT) to provide the PTT service, and performs Traffic Channel (TCH) setup. The term "nego" refers to a process for preparing for higher network sessions which range from physical layers including PPP session to application layers.

After this, the base station sends the PTT call request message (INVITE) to the PTT server which then confirms the ID of the called side based on the received message (INVITE). Next, in step 311, the PTT server sends the PTT call request message (INVITE) to the called mobile communication terminal (terminal B). Then, the called mobile communication terminal (terminal B) receives the PTT call request message (INVITE), and in step 313, informs the reception of the PTT call request message (INVITE) to the corresponding user by sounding the proper alarm sound and displaying the proper alarm message.

Steps 311 and 313 will be described in more detail as follows. The PTT server sends the PTT call request message (INVITE) to a corresponding base station which provides the services to the called mobile communication terminal (terminal B). The corresponding base station for the called mobile communication terminal periodically sends a paging signal such as a General Page (GP) to the called mobile communication terminal (terminal B) which then sends the corresponding response signal such as a Page Response (PS) for the GP to the corresponding base station. During such a paging process, the base station sends the PTT call request message (INVITE) in the form of SDB to the called mobile communication terminal (terminal B). Then, the called mobile communication terminal informs the reception of the PTT call request message (INVITE) to the called user. At the same time, the called mobile communication terminal (terminal B) sends an acknowledgement of the normal reception of the PTT call request message (INVITE) to the base station.

If the called user has recognized the reception of the PTT call request message (INVITE) in step 313, the called user can allow or accept the corresponding PTT call request by operating the proper keys such that, in step 314, the called mobile communication terminal (terminal B) can receive the key inputs for accepting the PTT call request, and in step 315 can send the PTT call request acceptance message to the PTT server via the wireless network. In step 317, the PTT server indicates just the PTT call request acceptance to the calling mobile communication terminal (terminal A) to allow calling through the PTT call traffic.

Steps 315 and 317 will be described in more detail as follows. When sending the PTT call request acceptance, the called mobile communication terminal (Terminal B) sends the PTT call request acceptance message (so called "200 OK") in the form of SDB to a corresponding base station. Then, the called mobile communication terminal (terminal B) negotiates (nego) with the corresponding base station for service option (SO_PTT) to provide the PTT service, and performs Traffic Channel (TCH) setup. The PTT call request acceptance message (200 OK) originated in the called mobile communication terminal (terminal B) is transferred finally to the calling mobile communication terminal (terminal A) via the base station of the called side, the PTT server and the base station of the calling side. The calling mobile communication terminal (terminal A) receives the PTT call request acceptance message to complete the traffic channel setup. Also, the calling mobile communication terminal informs the PTT call request acceptance to its user by displaying the alarm message through the display unit.

In the PTT call traffic between the calling and the called mobile communication terminals, a specific terminal (for example, terminal A) sends a speaking right request message referred to as a "Session Initiation Protocol (SIP) Ack" to the PTT server. Then, the PTT server controls the speaking permission requests between the terminals to grant the speaking permission to a proper mobile communication terminal. The mobile communication terminal which has obtained the speaking right transmits, in realtime, the talk burst to the PTT server through a Real Time Protocol (RTP). The PTT server performs buffering of the talk burst to transmit the buffered talk burst to the called mobile communication terminal through the RTP.

Figure 4:
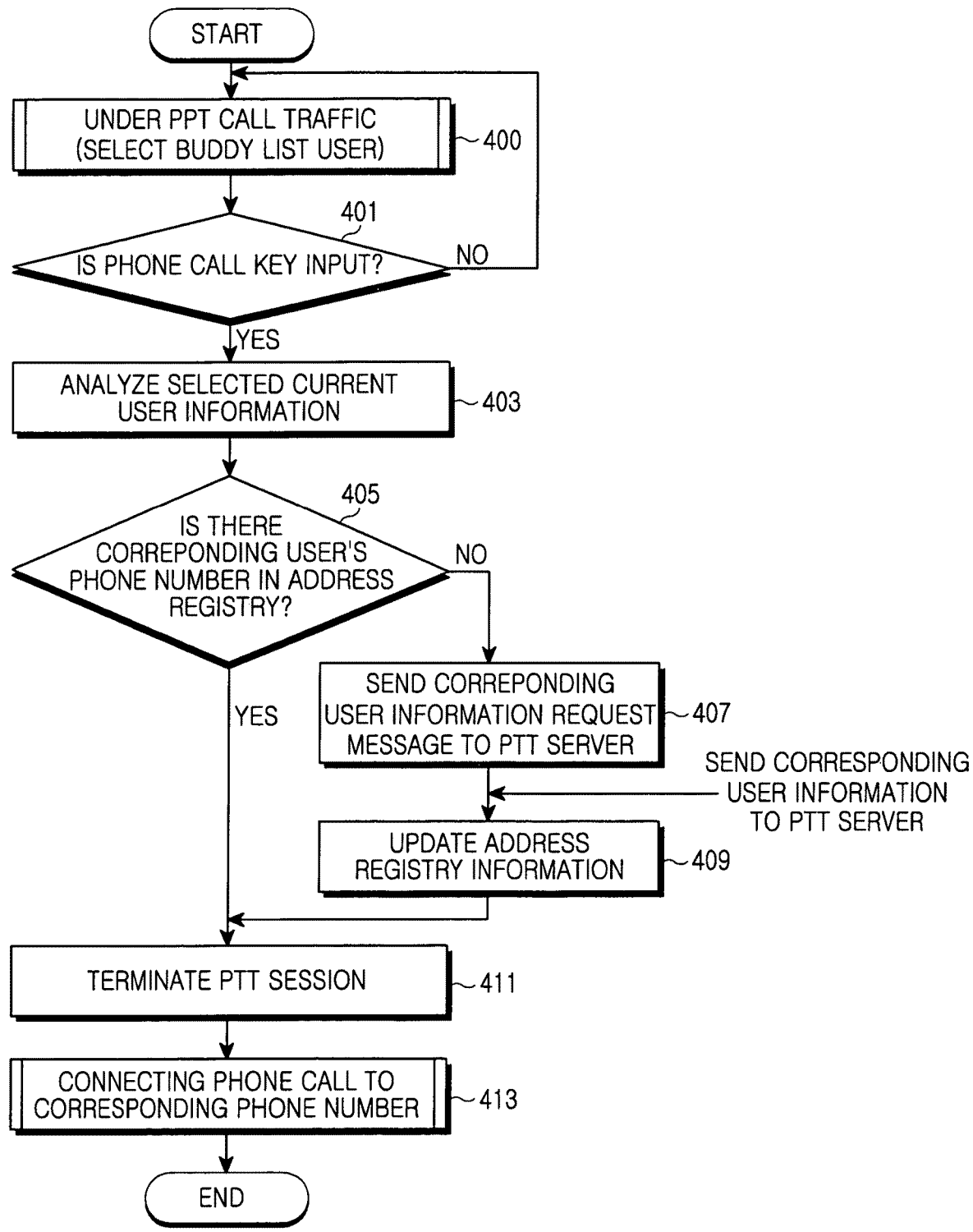
FIG. 4 illustrates a flow chart for explaining a general phone call connection during a PTT call traffic connection in the mobile communication system according to an embodiment of the present invention.

FIG. 4 illustrates a flow chart for explaining a general phone or voice call connection during a PTT call traffic in the mobile communication system according to an embodiment of the present invention. Referring to FIG. 4, in step 400, the mobile communication terminal is operating under the PTT call traffic as shown in FIG. 3. At this time, the user may select her/his particular counterpart from a buddy list which are now being displayed on the terminal. In this situation, if the user tries to change the current PTT call traffic into a general phone call (or a voice call) through which the user wants to communicate with her/his current-communicating counterpart, the user may input a phone call setting key or preferably 'a phone call key' which has been previously formed on the terminal according an embodiment of the present invention. If the phone call key has been input, then the mobile communication terminal monitors just the input key in step 401, and analyzes the selected current user information based on the buddy list in step 403. Next, in step 405, the mobile communication terminal determines if the selected current user information of the buddy list is identical to a user information previously stored in the address registry. Such a determining operation for confirming identification of the user information may be accomplished by comparing the corresponding names or phone numbers of the buddy list with those of the address registry.

If the mobile communication terminal confirms that both users are identical to each other in their information in step 405, then the process goes to step 411 wherein the current PTT session is terminated. Next, in step 413, the mobile communication terminal performs the phone call with the confirmed user phone number registered in the corresponding address registry.

If the mobile communication terminal, however, does not confirm that both users are identical to each other in their information in step 405, then the process goes to step 407 wherein the mobile communication terminal requests the corresponding user information (i.e., phone number information) of the buddy list to the PTT server through a predetermined message of a proper format. When receiving such a user information request message, the PTT server recognizes the requested user information of the corresponding buddy list to send the recognized user information to the requesting mobile communication terminal. Accordingly, the mobile communication terminal can update its address registry based on the received new user information in step 409. Through such an update operation, some information such as name, phone number, etc. can be newly added to the address registry. After finishing step 409, the process goes to step 411 wherein the current PTT session is terminated. Next, in step 413, the mobile communication terminal performs the phone call with the confirmed user phone number registered in the corresponding address registry.

As mentioned above, when the mobile communication terminal does not confirm that both users are identical to each other in their information in step 405, then through the steps 407 and 409, the mobile communication terminal requests the corresponding user information (i.e., phone number information) of the buddy list to the PTT server to receive the requested user information of the corresponding buddy list and to update its address registry based on the received new user information. Through steps 411 and 413, the current PTT session is terminated and the mobile communication terminal performs the phone call with the confirmed user phone number registered in the corresponding address registry. However, alternatively, after requesting and receiving the corresponding buddy list user information, the mobile communication terminal temporally may store the corresponding user's phone number without updating and directly perform step 411 and 413 through which the current PTT session is terminated and the mobile communication terminal performs the phone call with the confirmed user phone number registered in the corresponding address registry.

According to an embodiment of the present invention, during the PTT call traffic, the user can change the current PTT call traffic into the general phone call (or voice call) by simply inputting a phone call key so that the user may communicate with her or his selected counterpart included in the corresponding buddy list through the changed general phone call. Therefore, according to an embodiment of the present invention, it is possible to significantly reduce the time and inconvenience for placing a phone call while in the PTT talk mode.

As mentioned above, the phone call connection operation during the PTT call traffic can be performed in the mobile communication system according an embodiment of the present invention. While the invention has been shown and described with reference to certain embodiments thereof, it will be understood by those skilled in the art that various changes in form and details may be made therein without departing from the spirit and scope of the invention as defined by the appended claims.

What is claimed is:

1. A method for connecting a phone call during a Push To Talk (PTT) call in a mobile communication system, the method comprising the steps of:
   during the PTT call, locating subscriber information of a current subscriber selected from a buddy list, if a predetermined phone call key has been input;
   determining if the located subscriber information of the selected current subscriber is matched to information of a subscriber stored in an address registry to confirm the matched subscriber information of the address registry; and
   terminating the PTT session of the PTT call, connecting the phone call to the selected current subscriber's phone number based on the matched subscriber information of the address registry to perform the phone call.

2. The method as claimed in one of claims 1, wherein the step for determining if the subscriber information of the current selected subscriber searched from buddy list is matched to the subscriber information stored in the address registry, comprises comparing the corresponding subscriber's name or phone number of the buddy list with those of the address registry.

3. The method as claimed in claim 1, wherein the method further comprises the steps of:
   sending, to a PTT server, a request message of a predetermined format for requesting the PTT subscriber information and the buddy list, if the subscriber information of the selected current subscriber searched from the buddy list is not matched to the subscriber information stored in the address registry;
   receiving the requested PTT subscriber information and the buddy list from the PTT server to update the address registry based on the received PTT subscriber information and the received subscriber group list; and
   terminating the PTT session of the PTT call, connecting the phone call to the selected subscriber's phone number based on the updated subscriber information to perform the phone call traffic.

4. The method as claimed in one of claims 3, wherein the step for determining if the subscriber information of the current selected subscriber searched from the buddy list is matched to the subscriber information stored in the address registry, comprises comparing the corresponding subscriber's name or phone number of the buddy list with those of the address registry.

5. The method as claimed in claim 1, wherein the method further comprises the steps of:
   sending, to a PTT server, a request message of a predetermined format for requesting a phone number of the selected current subscriber, if the located subscriber information of the selected current subscriber is not matched to the subscriber information stored in the address registry;
   receiving and storing temporally the requested phone number from among the subscriber information from the PTT server; and
   terminating the PTT session of the PTT call, connecting the phone call to the temporally stored phone number to perform the phone call.

6. The method as claimed in one of claims 5, wherein the step for determining if the subscriber information of the current selected subscriber searched from the buddy list is matched to the subscriber information stored in the address registry, comprises comparing the corresponding subscriber's name or phone number of the buddy list with those of the address registry.

7. The method as claimed in claim 3, wherein the PTT server comprises a PTT over cellular server and a Group and List Management Server (GLMS).

8. The method as claimed in claim 1, wherein users can remotely establish, change or delete the buddy list information.

9. A method for connecting a phone call during a Push To Talk (PTT) call between a first and second subscriber in a mobile communication system, the method comprising the steps of:
   during the PTT call, selecting the second subscriber from a buddy list;
   inputting a predetermined key on a mobile terminal associated with a phone call;
   comparing stored subscriber information to the buddy list regarding the second subscriber; and
   if there is a match, terminating the PTT call and establishing the phone call using a phone number included in the stored subscriber information regarding the second subscriber.

10. A method for connecting a phone call during a Push To Talk (PTT) call in a mobile communication system, the method comprising the steps of:
    during the PTT call, searching a phone number of a current subscriber selected from a buddy list, if a predetermined phone call key has been input; and
    terminating the PTT session of the PTT call, connecting the phone call to the selected current subscriber's phone number to perform the phone call if the phone number is located from the buddy list.

* * * * *

UNITED STATES PATENT AND TRADEMARK OFFICE
CERTIFICATE OF CORRECTION

PATENT NO. : 7,599,704 B2 Page 1 of 1
APPLICATION NO. : 11/193375
DATED : October 6, 2009
INVENTOR(S) : Yoon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

Twenty-eighth Day of September, 2010

David J. Kappos
*Director of the United States Patent and Trademark Office*